(12) United States Patent
Reece et al.

(10) Patent No.: US 10,740,532 B1
(45) Date of Patent: Aug. 11, 2020

(54) ROUTE DRIVEN PLACEMENT OF FAN-OUT CLOCK DRIVERS

(71) Applicant: Cadence Design Systems, Inc., San Jose, CA (US)

(72) Inventors: William Robert Reece, Over (GB); Thomas Andrew Newton, Great Cambourne (GB); Zhuo Li, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 14 days.

(21) Appl. No.: 16/228,432

(22) Filed: Dec. 20, 2018

(51) Int. Cl.
*G06F 17/50* (2006.01)
*G06F 30/396* (2020.01)
*G06F 30/392* (2020.01)
*G06F 30/327* (2020.01)
*G06F 30/394* (2020.01)
*G06F 117/10* (2020.01)
*G06F 30/30* (2020.01)
*G06F 30/39* (2020.01)

(52) U.S. Cl.
CPC .......... *G06F 30/396* (2020.01); *G06F 30/327* (2020.01); *G06F 30/392* (2020.01); *G06F 30/30* (2020.01); *G06F 30/39* (2020.01); *G06F 30/394* (2020.01); *G06F 2117/10* (2020.01)

(58) Field of Classification Search
None
See application file for complete search history.

(56) References Cited

U.S. PATENT DOCUMENTS

| 5,309,370 | A | * | 5/1994 | Wong | G06F 30/392 716/119 |
| 6,530,073 | B2 | * | 3/2003 | Morgan | G06F 30/30 716/102 |
| 6,591,411 | B2 | * | 7/2003 | Alpert | G06F 30/327 716/129 |
| 6,609,228 | B1 | * | 8/2003 | Bergeron | G06F 30/392 716/113 |
| 7,051,310 | B2 | * | 5/2006 | Tsao | G06F 30/30 716/114 |

(Continued)

OTHER PUBLICATIONS

N.A. Sherwani et al., "Clock Layout for High-Performance ASIC Based on Weighted Center Algorithm," 1991 IEEE, 4 pages. (Year: 1991).*

(Continued)

*Primary Examiner* — Leigh M Garbowski
(74) *Attorney, Agent, or Firm* — Schwegman Lundberg & Woessner, P.A.

(57) ABSTRACT

Aspects of the present disclosure address improved systems and methods for generating a clock tree based on route-driven placement of fan-out clock drivers. Consistent with some embodiments, a method may include constructing a spanning tree comprising one or more paths that interconnect a set of clock sinks of a clock net of an integrated circuit device design. The method further includes calculating a center of the set of the clock sinks based on clock sink locations in the integrated circuit device design and identifying a point on the spanning tree nearest to the center of the set of clock sinks. The method further includes generating a clock tree by placing a clock driver at the point on the spanning tree that is nearest to the center of the set of clock sinks.

20 Claims, 10 Drawing Sheets

(56) References Cited

U.S. PATENT DOCUMENTS

| | | | | |
|---|---|---|---|---|
| 7,127,695 | B2* | 10/2006 | Huang | G01R 31/318591 |
| | | | | 716/103 |
| 7,181,720 | B2* | 2/2007 | Stammermann | G06F 30/30 |
| | | | | 716/104 |
| 7,185,217 | B1* | 2/2007 | Huxel | G06F 1/10 |
| | | | | 713/400 |
| 8,572,542 | B2* | 10/2013 | Shih | G06F 30/394 |
| | | | | 716/123 |
| 8,661,374 | B2* | 2/2014 | Vishweshwara | G06F 30/39 |
| | | | | 716/54 |
| 9,053,277 | B2* | 6/2015 | Chen | G06F 30/39 |
| 9,135,375 | B1* | 9/2015 | Sood | G06F 30/00 |
| 9,508,615 | B2* | 11/2016 | Lim | |
| 9,792,398 | B2* | 10/2017 | Xu | G06F 30/34 |
| 2009/0254874 | A1* | 10/2009 | Bose | G06F 30/39 |
| | | | | 716/113 |

OTHER PUBLICATIONS

J.-D. Cho et al., "A Buffer Distribution Algorithm for High-Performance Clock Net Optimization," IEEE Trans. on Very Large Scale Integration (VLSI) Systems, vol. 3, No. 1, Mar. 1995, pp. 84-98. (Year: 1995).*

\* cited by examiner

ROUTE DRIVEN PLACEMENT OF FAN-OUT CLOCK DRIVERS

TECHNICAL FIELD

The present disclosure generally relates to the technical field of integrated circuit design. In particular, the present disclosure addresses systems and methods for route driven placement of fan-out drivers while generating a clock tree.

BACKGROUND

An integrated circuit (IC) layout specifies portions of various components of an IC. When the IC is to include a large number of registers, latches, flip-flops and/or other types of clocked devices ("sinks") that are to be clocked by one or more clocks, the IC must include one or more clock trees for delivering the clock signal from the clock source to all of the sinks to be clocked by it. A clock tree distributes a clock signal from its root to a set of sinks within an IC through a branching network of fan-out drivers (e.g., buffers or inverters). A single driver distributes the clock signal to a grouping of sinks referred to as a "clock net."

Electronic design automation (EDA) software systems commonly perform clock-tree construction. As part of clock-tree construction, the EDA software assigns a position to each net driver so that a possible tree topology can be evaluated. While this initial position may be later refined by the EDA software, the position assignments determined during clock-tree construction determine an overall tree topology thereby impacting the performance of the IC device. According to one conventional approach, a minimum bounding box is determined for all sinks in a clock net, and a net driver is placed at the center of the bounding box. Although this approach can provide benefits in terms of skew and electro-migration (EM), it often results in layouts with excessive wire length.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

As noted above, traditional approaches for placing a clock driver result in integrated circuit layouts with excessive wire lengths. Aspects of the present disclosure address this problem, among others, with systems and methods for route driven placement of fan-out drivers. Consistent with some embodiments, the method may include constructing a spanning tree comprising one or more paths that interconnect a set of clock sinks of an integrated circuit design. The spanning tree may be a minimum-spanning-tree (MST) that interconnects the set of clock sinks using a minimum possible wire length. The method further includes calculating a center of the set of the clock sinks based on a statistical mean of all sink locations. In some embodiments, the center of the set of clock sinks is based on a weighted mean of all sink locations. Such a weight may, for example, be based on a capacitance value associated with a clock sink. The method further includes identifying a point on the spanning tree nearest to the center of the set of clock sinks and placing a clock driver at the point.

When applied in clock tree construction, the route drive fan-out clock driver placement approach described herein produces low-skew leaf clusters, which in turn reduces a total area cost required to generate a balanced clock tree, reducing the total amount of wire required to build the clock tree. Moreover, in some instances, the route drive fan-out clock driver placement approach may save clock area by reducing a number of fan out drivers. As a result, a significant power savings may be achieved on small geometry designs compared to that of traditional approaches. Further, this route-driven approach produces fewer EM issues on high-fan-out nets compared to traditional approaches.

Figure 1:
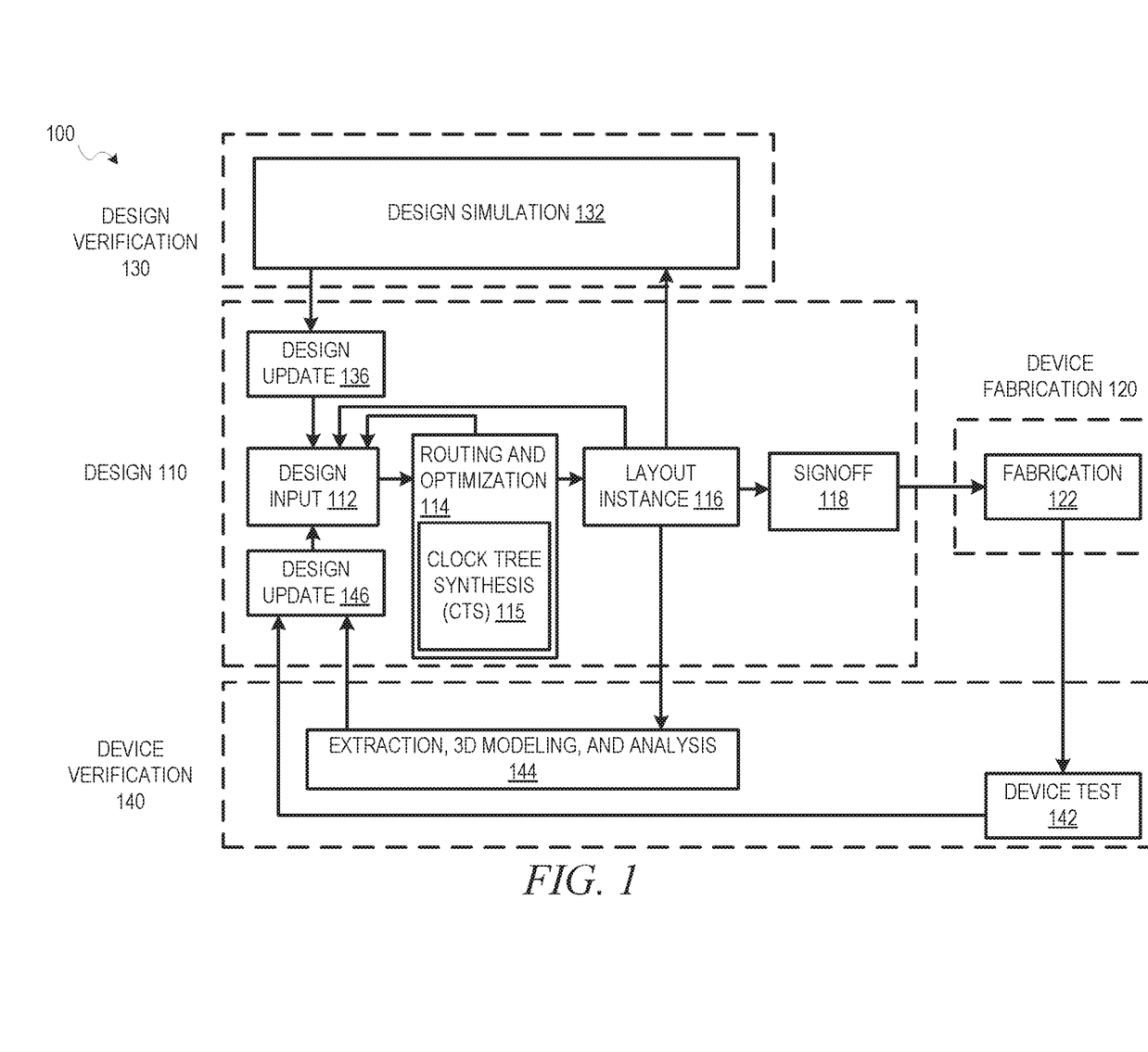
FIG. 1 is a diagram illustrating an example design process flow for route driven placement of fan-out drivers, according to some embodiments.

FIG. 1 is a diagram illustrating an example design process flow 100 that includes route-driven placement of fan-out clock drivers, according to some embodiments. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, timing analysis, and optimization are performed in a routing and optimization 114 operation, along with any other automated design processes. While the design process flow 100 shows optimization 114 occurring prior to a layout instance 116, routing, timing analysis, and optimization 114 may be performed at any time to verify operation of a circuit design. For instance, in various embodiments, timing analysis in a circuit design may be performed prior to routing of connections in the circuit design, after routing, during register transfer level (RTL) operations, or as part of a signoff 118, as described below.

As shown, the routing and optimization 114 operation includes a clock tree synthesis (CTS) 115 operation, which may be performed in accordance with various embodiments described herein. In particular, the CTS 115 operation can generate a clock tree that delivers a clock signal from a clock tree root, which comprises a clock source of a circuit design, to a plurality of clock tree leaf nodes, which comprises a plurality of clock tree sinks within the circuit design. According to various embodiments, the clock tree generation performed as part of the CTS 115 operation includes placing clock drivers at various regions of the IC design based on satisfaction of a set of clock tree design constraints, which can include slew, latency, and power consumption by the generated clock tree. Each clock tree driver delivers the clock signal to a set of clock sinks that form a clock net of the IC design. As will be discussed in further detail below, a spanning tree is constructed to interconnect a set of clock sinks of a clock net according to a net definition, and a clock driver is placed on the spanning tree at a point that is nearest to a center of the set of sinks. This process may be repeated for each net in the IC design.

After design inputs are used in the design input 112 operation to generate a circuit layout, and any of the routing and optimization 114 operations are performed, a layout is generated in the layout instance 116. The layout describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device; or additional testing and design updates may be performed using designer inputs or automated updates based on design simulation 132 operations or extraction, 3D modeling, and analysis 144 operations. Once the device is generated, the device can be tested as part of device test 142 operations, and layout modifications generated based on actual device performance.

A design update 136 from the design simulation 132; a design update 146 from the device test 142 or the extraction, 3D modeling, and analysis 144 operations; or the design input 112 operation may occur after the initial layout instance 116 is generated. In various embodiments, whenever design inputs are used to update or change an aspect of a circuit design, a timing analysis and the routing and optimization 114 operation may be performed.

Figure 2:
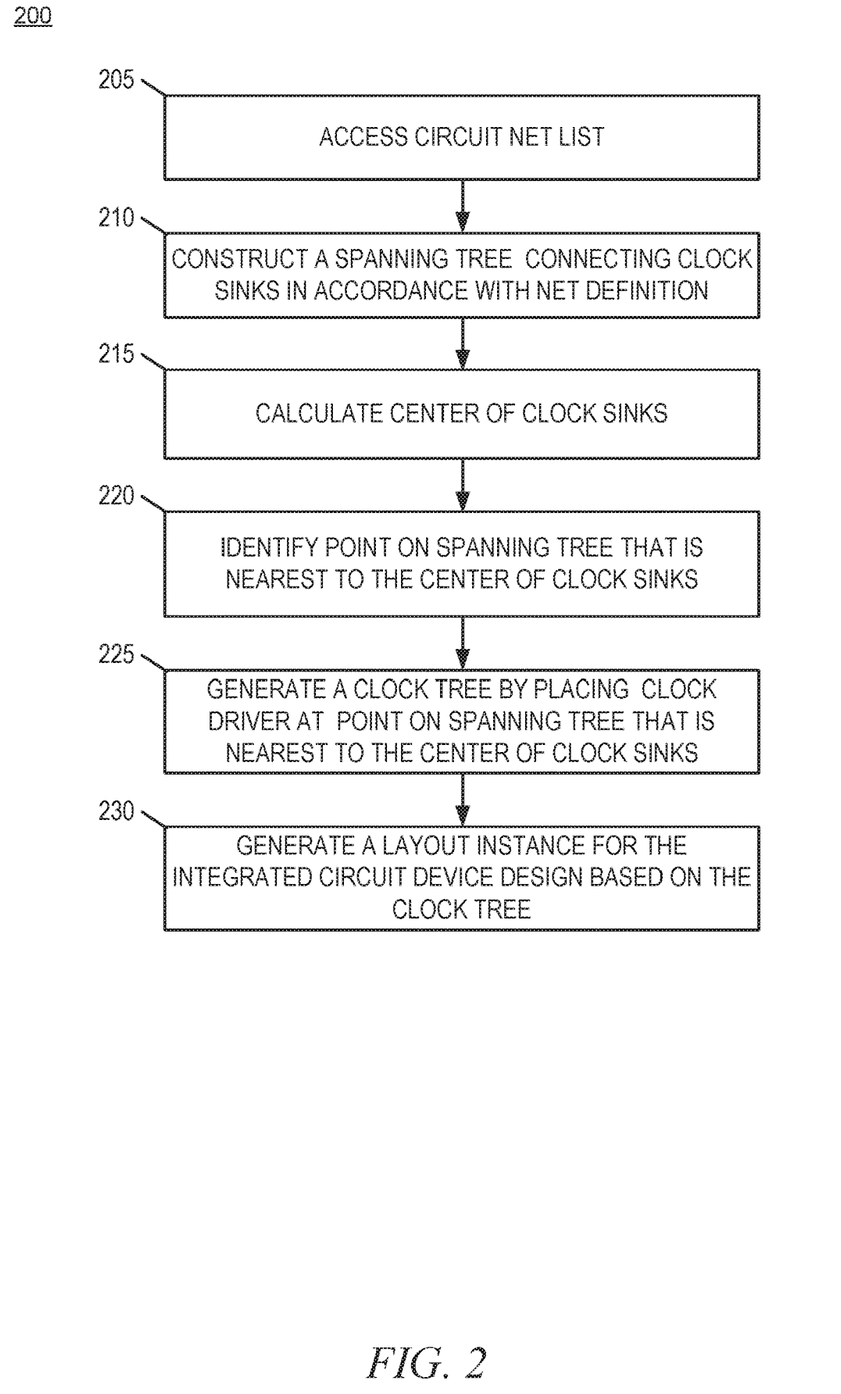
FIGS. 2 and 3 are flowcharts illustrating operations of a method for generating a clock tree based on route driven placement of a fan-out driver, according to some example embodiments.
Figure 3:
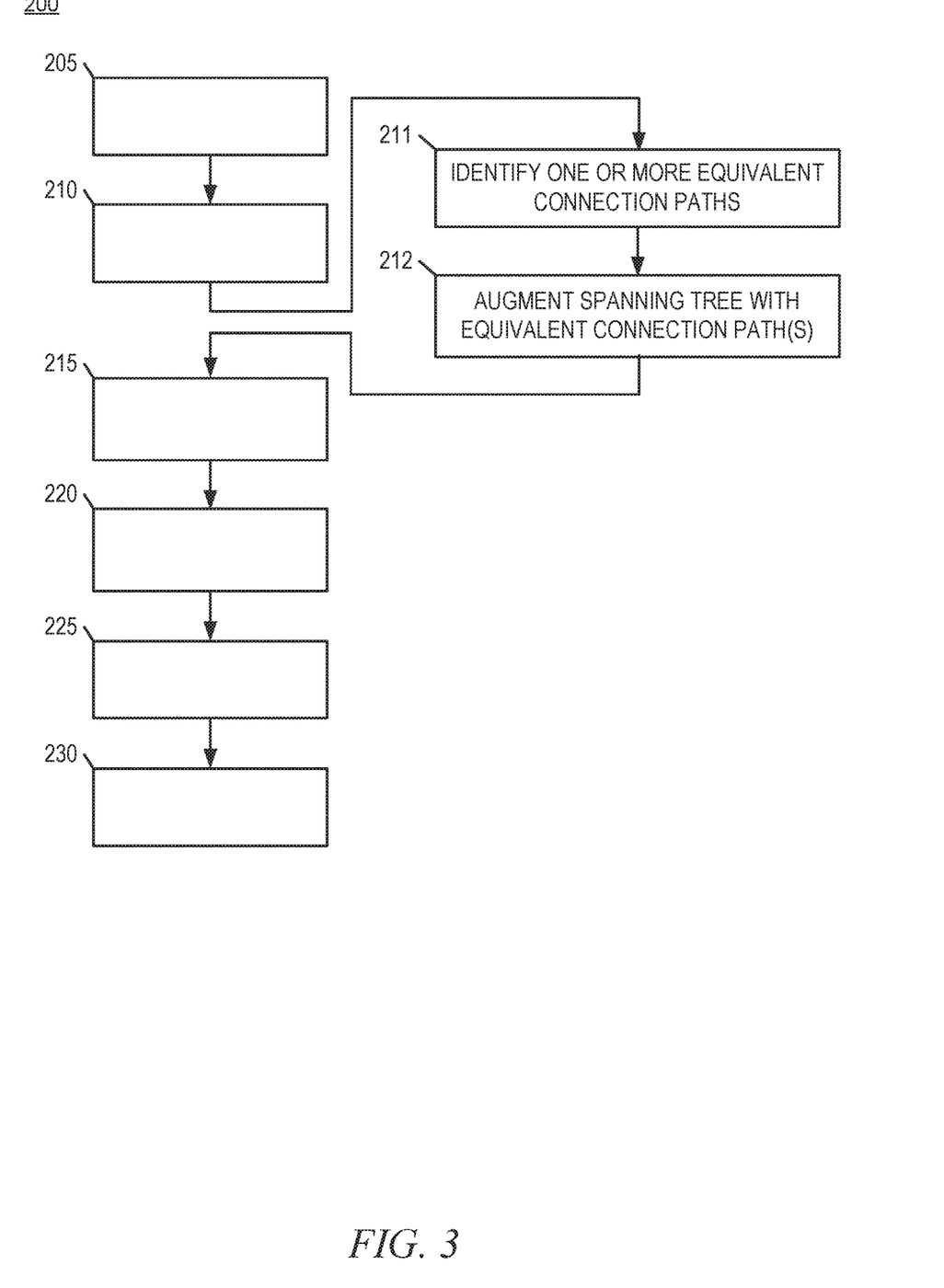

FIGS. 2 and 3 are flowcharts illustrating operations of a method 200 for generating a clock tree based on route driven placement of a fan-out driver, according to some example embodiments. For some embodiments, the method 200 is performed as part of a place and route process applied to a circuit design (e.g., by an EDA software system).

It will be understood that the method 200 may be performed by a device, such as a computing device executing instructions of an EDA software system. For instance, the operations of a method 200 may be represented by executable instructions (e.g., EDA software) that, when executed by a processor of a computing device, cause the computing device to perform the method 200. Thus, an operation of the method 200 may be performed by a hardware processor (e.g., central processing unit or graphics processing unit) of a computing device (e.g., desktop, server, etc.). Accordingly, the method 200 is described below in reference to such a computing device.

Depending on the embodiment, an operation of the method 200 may be repeated in different ways or involve intervening operations not shown. Though the operations of the method 200 may be depicted and described in a certain order, the order in which the operations are performed may vary among embodiments, including performing certain operations in parallel.

The method 200 as illustrated begins at operation 205 where the computing device accesses a net list of an IC device design that includes one or more net definitions. A net definition specifies interconnections between a set of clock sinks of a clock net. The computing device may access the net list from a database of an EDA system.

At operation 210, the computing device constructs a spanning tree comprising paths that interconnect a set of clock sinks in accordance with a net definition included in the net list of the IC device design. The spanning tree may be expressed or otherwise represented as using geometric shapes to represent IC components (e.g., the clock sink) and lines to represent the paths connecting the components as illustrated in FIGS. 4A-4F and described below.

The constructing of the spanning tree may include constructing a minimum-spanning-tree (MST) that interconnects the set of clock sinks while minimizing a total length of the paths. That is, the MST uses the minimum possible total path length to interconnect the set of clock sinks. In constructing the MST, the computing device may use one of many known MST algorithms or techniques such as Borůvka's algorithm, Prim's algorithm, Kruskal's algorithm, or the reverse-delete algorithm.

The computing device, at operation 215, determines a center of the set of clock sinks of the clock net in the IC device design. A location of each clock sink may be included in an initial IC device design layout instance. Further, a location of each clock sink may be represented by latitudinal and longitudinal coordinates (referred to as "x" and "y" coordinates in common parlance) that describe a location within a region of the IC device design that encompasses the set of clock sinks of the clock net. The computing device may determine the center of the set of clock sinks by determining a statistical mean of all clock sink locations in the set of clock sinks and thus the center of the set of clock sinks may also be expressed using latitudinal and longitudinal coordinates that describe the location of the center of the set of clock sinks within the region of the IC design. In calculating the statistical mean location of the set of clock sinks, the computing device determines a statistical mean of latitudinal coordinates of the set of clock sinks and a statistical mean of longitudinal coordinates of the set of clock sinks. Hence, the center of the set of clock sinks may be expressed as the statistical mean of latitudinal coordinates and the statistical mean of longitudinal coordinates.

Consistent with some embodiments, the calculating of the center of the set of clock sinks may include calculating a weighted center of the set of clock sinks. In determining the weighted center of the set of clock sinks, the computing device may apply a weight to one or more of any clock sink latitudinal or longitudinal coordinates in determining the statistical mean of all clock sink locations. Such a weight may, for example, be based on a capacitance value associated with a clock sink.

At operation 220, the computing device identifies a point on the spanning tree that is nearest to the center of the set of clock sinks in the clock net. That is, the computing device identifies a point on a connection path of the spanning tree that is the shortest distance to the center of the set of clock sinks. The computing device may determine the shortest distance based on a difference between the coordinates of the center of the set of clock sinks and coordinates of the connection paths.

The computing device, at operation 225, generates a clock tree by placing a clock driver at the point on the spanning tree that is nearest to the center of the set of clock sinks. In placing the clock driver, the computing device assigns the clock driver to a position corresponding to the point on the spanning tree that is nearest to the center of the set of clock sinks. The assignment of the clock driver to the position results in a clock tree. Placing the clock driver at this location produces a balanced clock tree since the clock driver is near the center of the clock sinks it drives; further, placing the clock driver on the spanning tree rather than at the actual center reduces the overall wire-length of the clock tree. Using the center of the set of clock sinks as a basis for the location of the clock driver reduces the impact of outlier clock sinks that may otherwise impact the skew and wire-length of conventional bounding-box-based approaches. Further, in some instances, placing the dock driver at this position on the spanning tree may save dock area by reducing a total number of fan out drivers needed to drive the clock sinks in the clock net.

At operation 230, the computing device generates a design layout instance for the IC device design based in part on the clock tree. The layout describes the physical layout dimensions of the IC device.

As shown in FIG. 3, the method 200 may, in some embodiments, further include operations 211 and 212. Consistent with these embodiments, the operations 211 and 212 may be performed subsequent to operation 210 where the computing device constructs the spanning tree.

With reference to constructing the spanning tree, there may be portions of the spanning tree where clock sinks may be connected by either a horizontal path followed by a vertical path or a vertical path followed by a horizontal path with equivalent wire-capacitance. Initially, the spanning tree may be constructed using only one of these connection paths. At operation 211, the computing device identifies one or more equivalent connection paths. That is, the computing device identifies one or more alternative connection paths that have an equivalent wire-capacitance, length, or resistance. For example, the spanning tree may include a first path that connects a first and second clock sink and the computing device may identify a second path with an equivalent wire-capacitance, length, or resistance that also connects the first and second clock sink. Though the second path is "equivalent" to the first path in that it connects the first and second clock sink using the same wire-capacitance, length, or resistance, the second path is distinct from the first path.

At operation 212, the computing device augments the spanning tree with the one or more equivalent connection paths. In augmenting the spanning tree, the computing device adds the one or more equivalent connection paths to the spanning tree such that the spanning tree includes the one or more equivalent connection paths in addition to the initially determined connection paths.

Consistent with some embodiments, the clock driver may be placed on one of the equivalent connection paths at operation 225 described above. Following the example above, the clock driver may be placed on the second path rather than the first path.

Figure 4A:
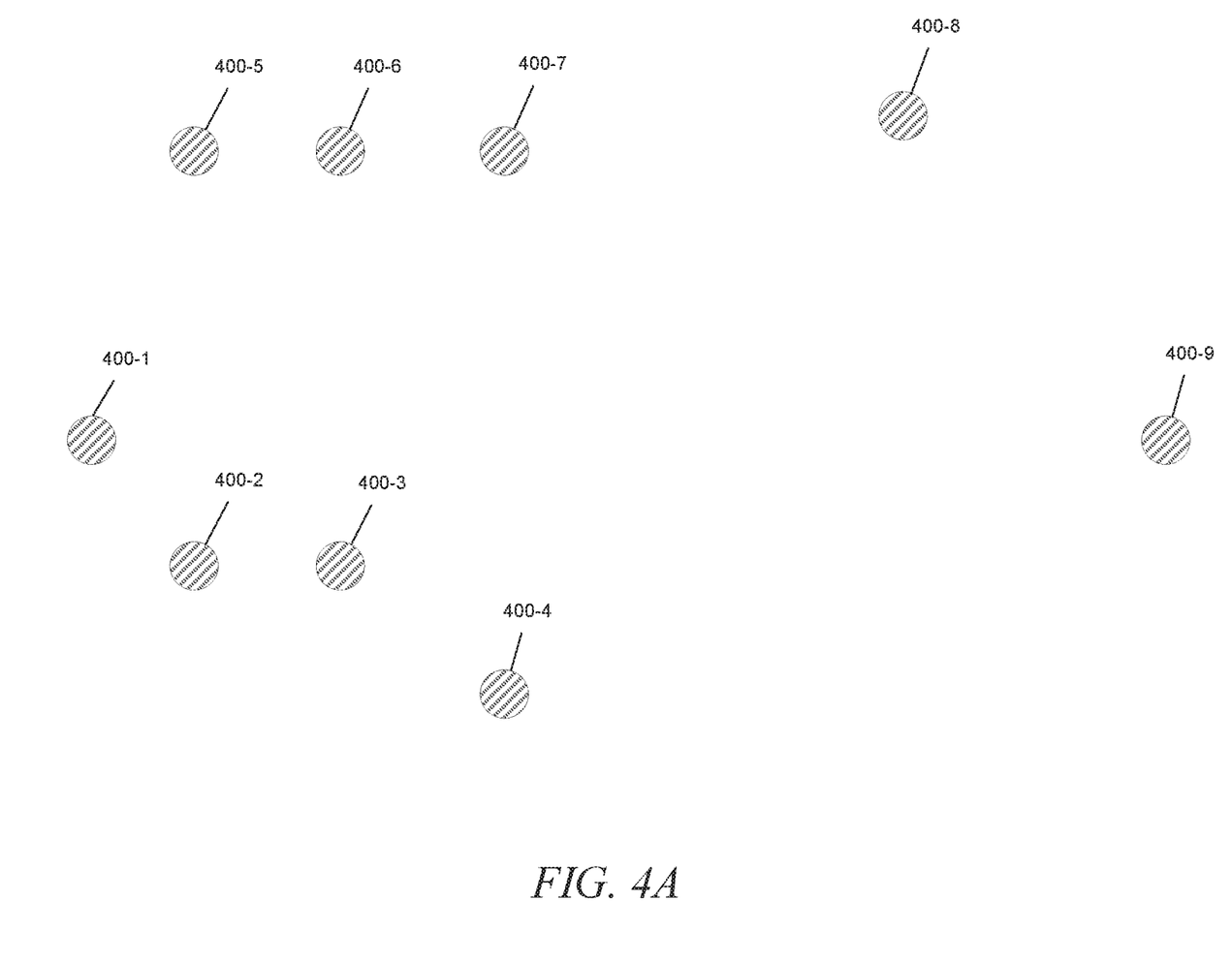
FIG. 4A-4F are conceptual diagrams that graphically illustrate a method for generating a clock tree based on route driven placement of a fan-out driver, according to some example embodiments.

FIGS. 4A-4F are conceptual diagrams that graphically illustrate a method for generating a clock tree based on route driven placement of a fan-out driver, according to some example embodiments. With reference to FIG. 4A, a set of clock sinks within a region of an IC design is shown. The set of clock sinks may correspond to a clock net defined by a net definition included in a net list of the IC design (e.g., the net list accessed at operation 205). The set of clock sinks of the clock net comprises clock sinks 400-1 to 400-9.

Figure 4B:
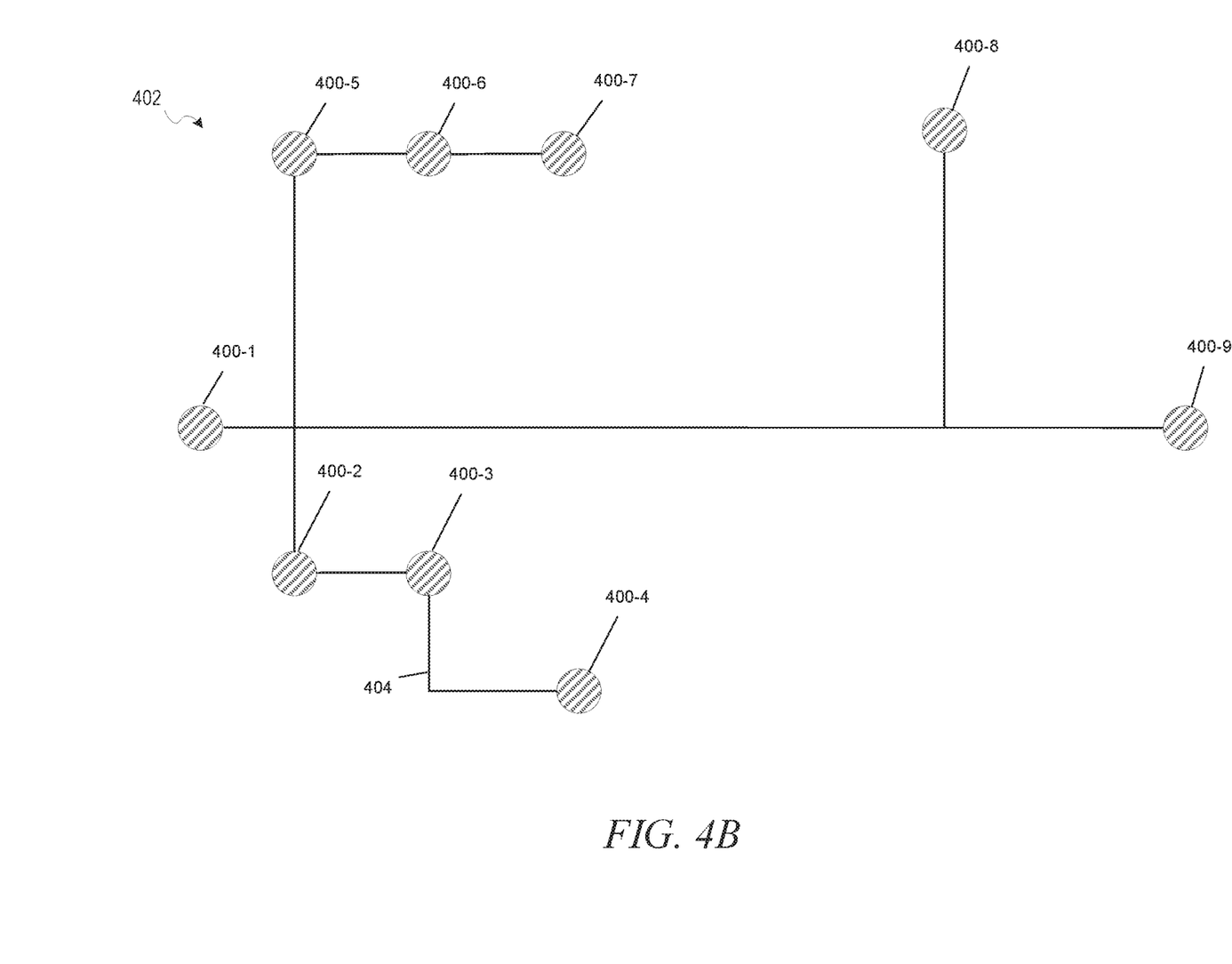
Figure 4C:
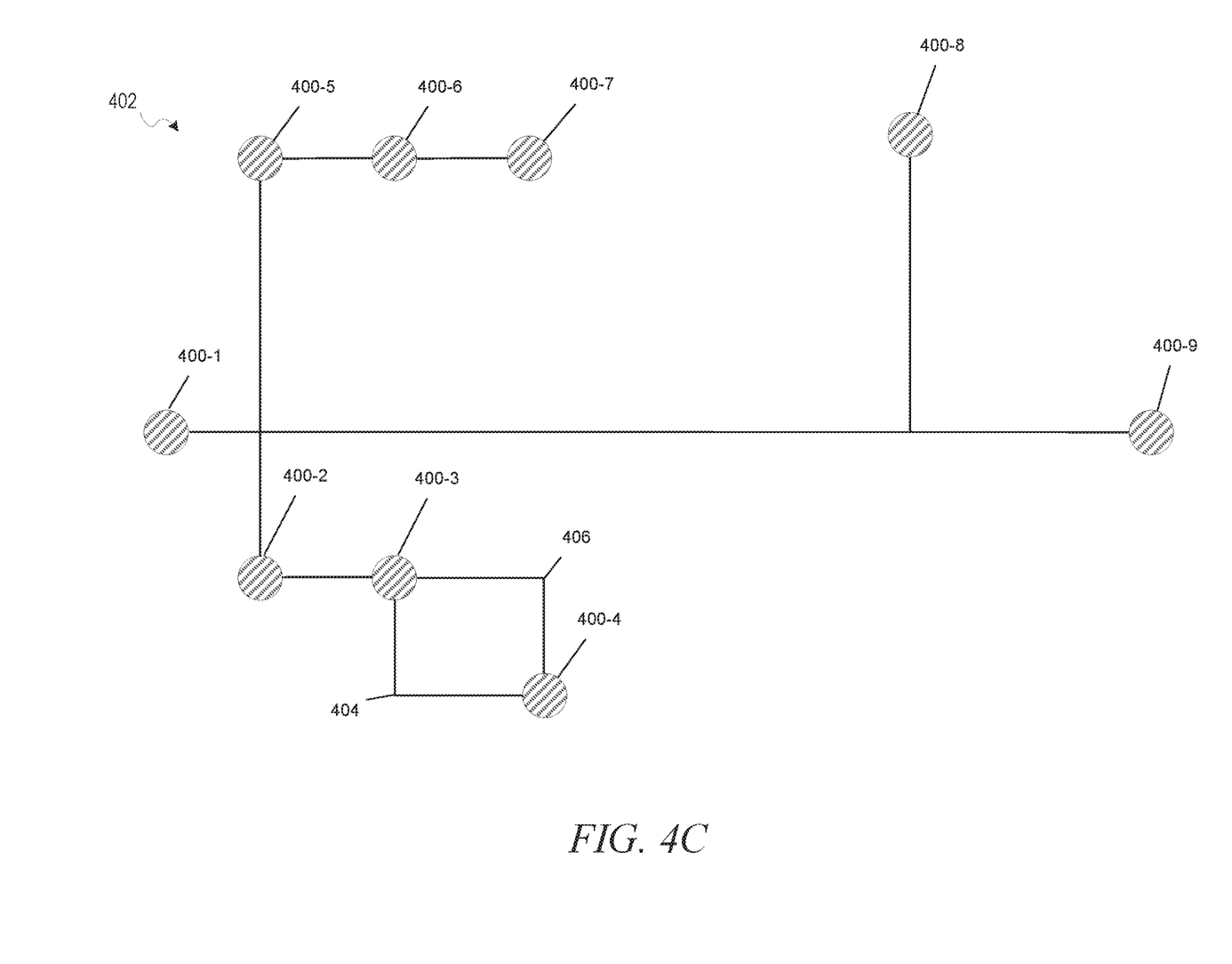

As shown in FIG. 413, a spanning tree 402 is constructed (e.g., by an EDA software system) to interconnect the clock sinks 400-1 to 400-9 in accordance with connections specified by a net definition (e.g., operation 210). For example, a path 404 connects clock sink 400-3 and 400-4. In FIG. 4C, the spanning tree 402 is augmented (e.g., by the EDA software system) to include path 406 (e.g., operation 212), which also connects the clock sinks 400-3 and 400-4 (e.g., with an equivalent wire capacitance, length, or resistance). In this way, path 406 is an equivalent connection path to path 404.

Figure 4D:
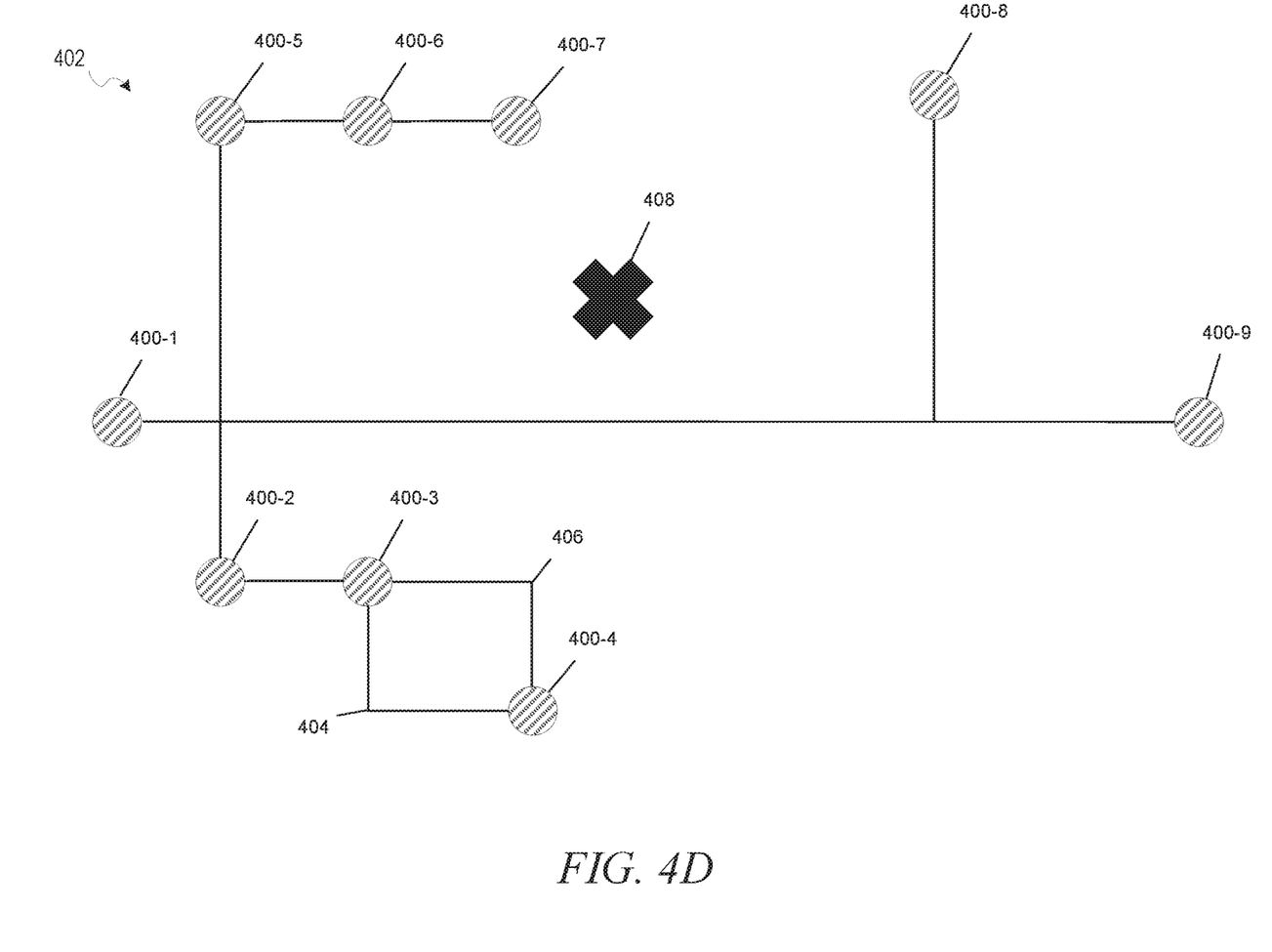
Figure 4E:
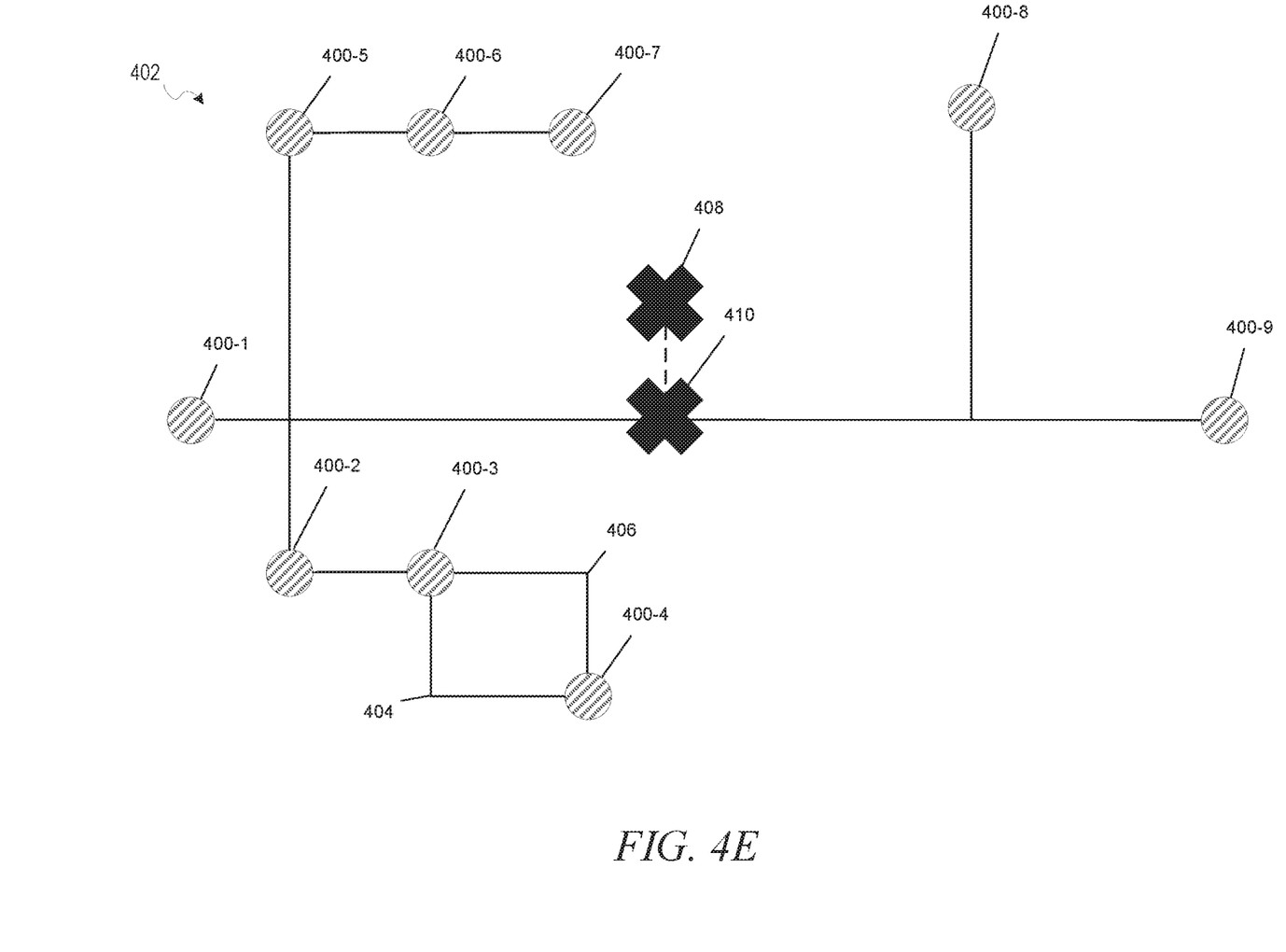
Figure 4F:
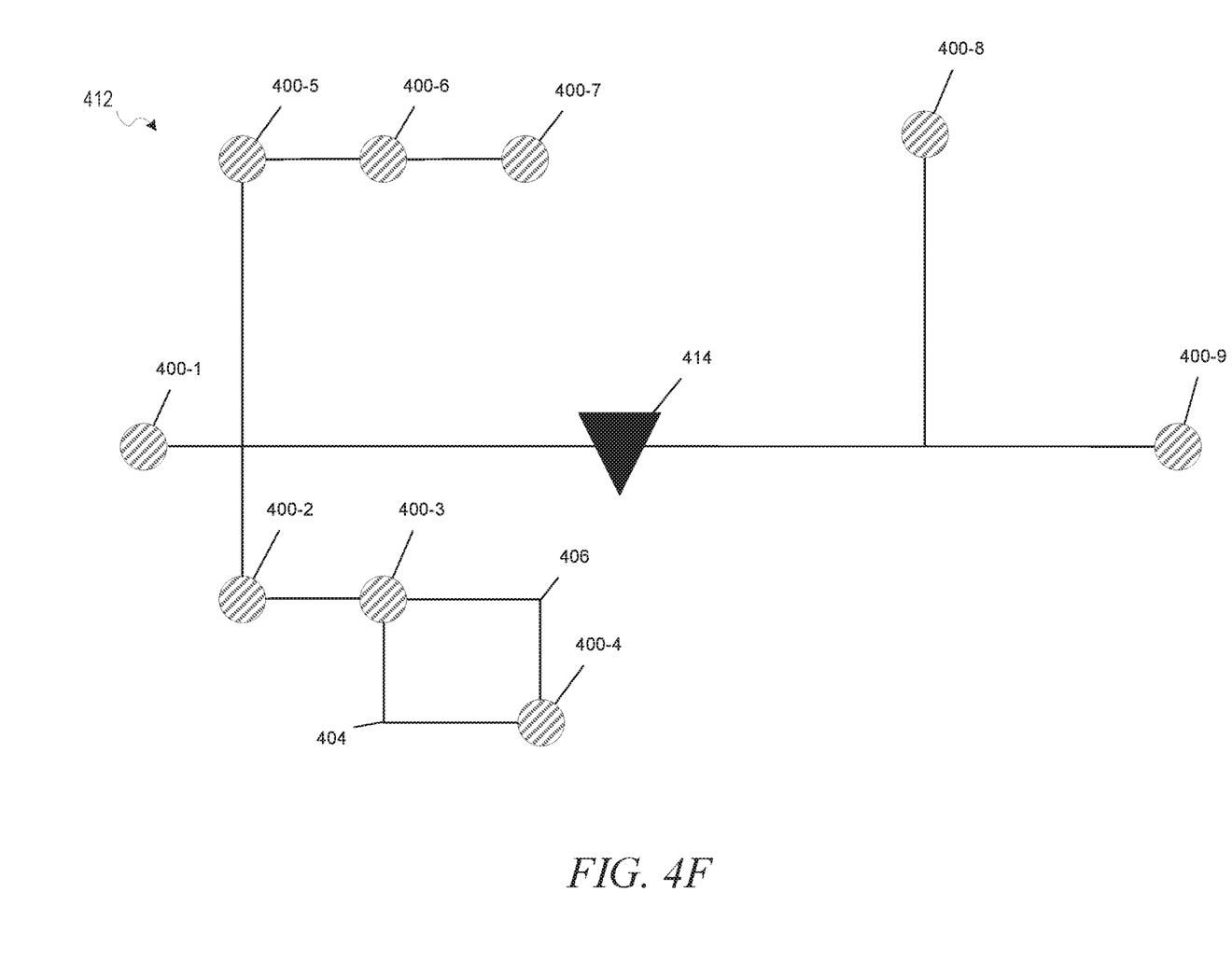

With reference to FIG. 4D, element 408 corresponds to the center of the clock sinks 400-1 to 400-9. As discussed above, the center of the clock sinks 400-1 to 400-9 may be determined (e.g., by the EDA software system) based on the statistical mean of locations of the clock sinks 400-1 to 400-9 (e.g., at operation 215). With reference to FIG. 4E, point 410 on the spanning tree 402 is identified (e.g., by the EDA software system) as the nearest point to the center of the clock sinks 400-1 to 400-9. Accordingly, FIG. 4F illustrates a clock tree 412 with a clock driver 414 placed (e.g., by the EDA software system) at the point 410.

Figure 5:
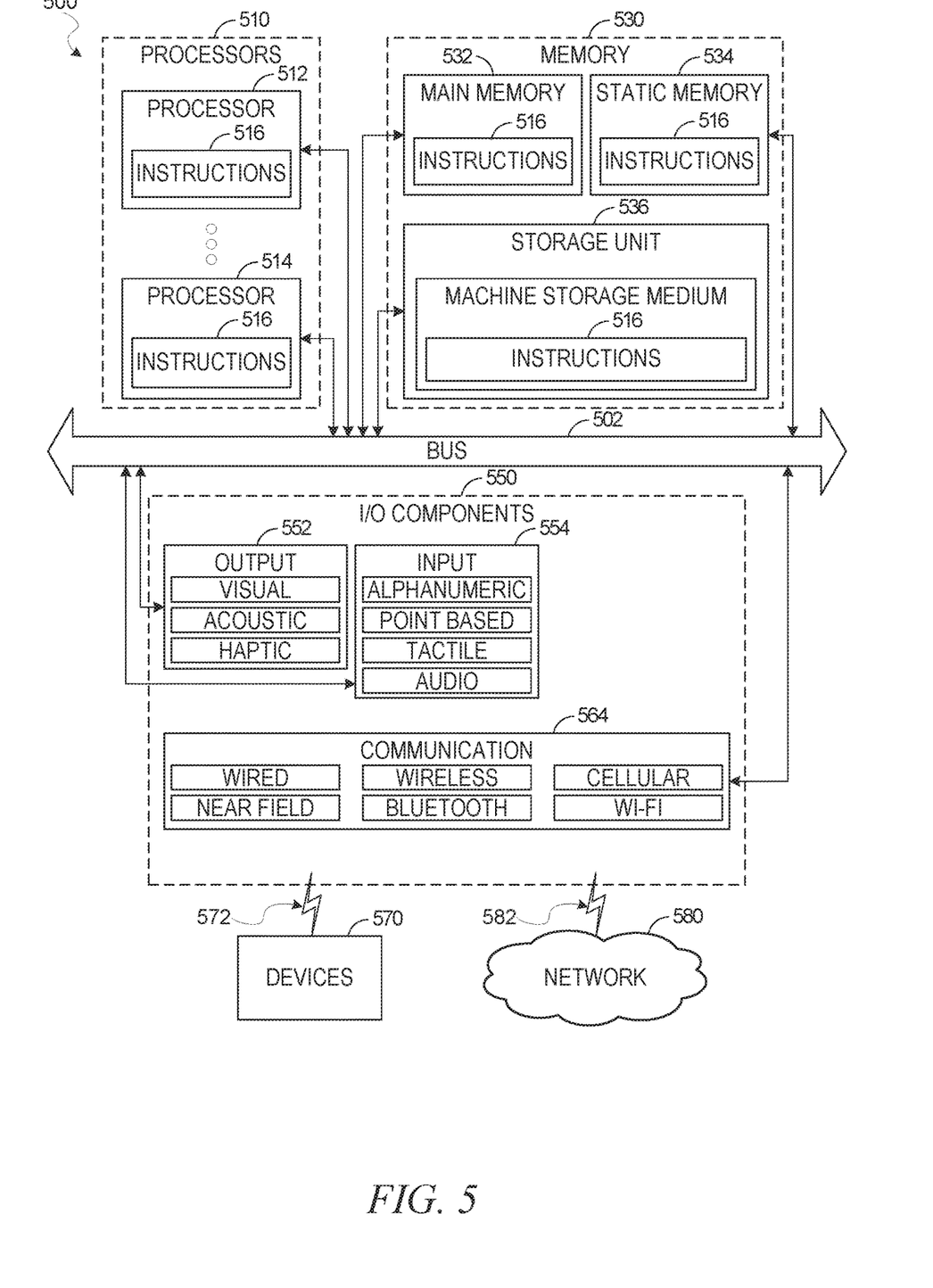
FIG. 5 is a diagrammatic representation of a machine in the example form of a computer system within which a set of instructions for causing the machine to perform any one or more of the methodologies discussed herein may be stored and executed.

FIG. 5 illustrates a diagrammatic representation of a machine 500 in the form of a computer system within which a set of instructions may be executed for causing the machine 500 to perform any one or more of the methodologies discussed herein, according to an example embodiment. Specifically, FIG. 5 shows a diagrammatic representation of the machine 500 in the example form of a computer system, within which instructions 516 (e.g., software, a program, an application, an apples, an app, or other executable code) for causing the machine 500 to perform any one or more of the methodologies discussed herein may be executed. For example, the instructions 516 may correspond to an EDA software system that causes the machine 500 to execute the method 200. Additionally, or alternatively, the instructions 516 may implement FIGS. 1 and 4A-4F. The instructions 516 transform the general, non-programmed machine 500 into a particular machine 500, such as an EDA system, programmed to carry out the described and illustrated functions in the manner described here. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and I/O components 550, which may be configured to communicate with each other such as via a bus 502. In an example embodiment, the processors 510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (MC), another processor, or any suitable combination thereof) may include, for example, a processor 512 and a processor 514 that may execute the instructions 516. The term "processor" is intended to include multi-core processors 510 that may comprise two or more independent processors (sometimes referred to as "cores") that may execute instructions contemporaneously. Although FIG. 5 shows multiple processors 510, the machine 500 may include a single processor with a single core, a single processor with multiple cores (e.g., a multi-core processor), multiple processors with a single core, multiple processors with multiple cores, or any combination thereof.

The memory 530 may include a main memory 532, a static memory 534, and a storage unit 536, both accessible to the processors 510 such as via the bus 502. The main memory 532, the static memory 534, and the storage unit 536 store the instructions 516 embodying any one or more of the methodologies or functions described herein. The instructions 516 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion and the grouping is in no way limiting. In various example embodiments, the I/O components 550 may include output components 552 and input components 554. The output components 552 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 550 may include communication components 564 operable to couple the machine 500 to a network 580 or devices 570 via a coupling 582 and a coupling 572, respectively. For example, the communication components 564 may include a network interface component or another suitable device to interface with the network 580. In further examples, the communication components 564 may include wired communication components, wireless communication components, cellular communication components, and other communication components to provide communication via other modalities. The devices 570 may be another machine or any of a wide variety of peripheral devices (e.g., a peripheral device coupled via a universal serial bus (USB)).

Executable Instructions and Machine Storage Medium

The various memories (e.g., 530, 532, 534, and/or memory of the processor(s) 510) and/or the storage unit 536 may store one or more sets of instructions and data structures (e.g., software) embodying or utilized by any one or more of the methodologies or functions described herein. These instructions, when executed by the processor(s) 510, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network, and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UNITS), High-Speed Packet, Access (HSPA), Worldwide Interoperability for Microwave Access (WiMAX), Long Term Evolution (LTE) standard, others defined by various standard-setting organizations, other long-range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., hypertext transfer protocol (HTTP)). Similarly, the instructions 516 may be transmitted or received using a transmission medium via the coupling 572 (e.g., a peer-to-peer coupling) to the devices 570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 516 for execution by the machine 500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "13 but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A electronic design automation (EDA) system comprising:
    one or more processors of a machine; and
    a computer storage medium storing instructions, which when executed by the machine, cause the machine to perform operations comprising:
        constructing a spanning tree comprising one or more paths that interconnect a set of clock sinks in a clock net of an integrated circuit (IC) device design;
        calculating a center of the set of clock sinks in the clock net by calculating a mean of clock sink locations of the set of clock sinks in the clock net;
        identifying a point on the spanning tree nearest to the center of the set of clock sinks;
        generating a clock tree by placing a clock driver at the point on the spanning tree nearest to the center of the set of clock sinks; and
        generating a layout instance for the IC device design based in part on the clock tree, the layout instance describing physical layout dimensions of the IC device design.

2. The EDA system of claim 1, wherein:
    the spanning tree comprises a first path that connects a first and second clock sink;
    the operations further comprise:
        identifying a second path that connects the first and second clock sinks, the second path being distinct from the first path; and
        augmenting the spanning tree to include the second path in addition to the first path.

3. The EDA system of claim 2, wherein the point on the spanning tree nearest to the center of the set of clock sinks corresponds to one of: the first path, the second path, or a third path that connects a third and fourth clock sink.

4. The EDA system of claim 1, wherein the mean of clock sink locations comprises:
a mean of longitudinal coordinates of sinks and a mean of latitudinal coordinates of sinks.

5. The EDA system of claim 4, wherein:
each clock sink location comprises a longitudinal coordinate and a latitudinal coordinate;
the calculating of the mean of clock sink locations of the set of clock sinks comprises:
calculating a mean of all longitudinal coordinates of the set of clock sinks; and
calculating a mean of all latitudinal coordinates of the set of clock sinks.

6. The EDA system of claim 4, wherein the calculating of the center of the set of clock sinks further comprises applying a weight to a location of a clock sink based on a capacitance value associated with the clock sink prior to calculating the mean of all clock sink locations.

7. The EDA system of claim 1, wherein the constructing of the spanning tree comprises constructing a minimum-spanning-tree, the minimum-spanning-tree minimizing a total length of the one or more paths that interconnect the set of clock sinks.

8. The EDA system of claim 1, wherein the operations further comprise:
accessing a net list comprising a net definition defining interconnections between the set of clock sinks, wherein the one or more paths interconnect the set of clock sinks in accordance with the net definition.

9. A method for electronic design automation, the method comprising:
accessing a database, using one or more hardware processors, to obtain a net list comprising a net definition defining interconnections between a set of clock sinks in a clock net of an integrated circuit (IC) device design;
constructing, using the one or more hardware processors, a spanning tree comprising one or more paths that interconnect the set of clock sinks of the clock net in accordance with the net definition;
calculating a mean sink location of the set of clock sinks in the clock net based on clock sink locations of the set of clock sinks in the IC device design;
identifying, using the one or more hardware processors, a point on the spanning tree nearest to the mean sink location of the set of clock sinks; and
placing a clock driver at the point on the spanning tree nearest to the mean sink location of the set of clock sinks, the placing of the clock driver at the point on the spanning tree yielding a clock tree.

10. The method of claim 9, wherein:
the spanning tree comprises a first path that connects a first and second clock sink;
the operations further comprise:
identifying a second path that connects the first and second clock sinks, the second path being distinct from the first path; and
augmenting the spanning tree to include the second path in addition to the first path.

11. The method of claim 10, wherein the point on the spanning tree nearest to the center of the set of clock sinks corresponds to one of: the first path the second path, or a third path that connects a third and fourth clock sink.

12. The method of claim 9, wherein the mean of clock sink locations comprises:
a mean of longitudinal coordinates of sinks and a mean of latitudinal coordinates of sinks.

13. The method of claim 12, wherein:
each clock sink location comprises a longitudinal coordinate and a latitudinal coordinate;
the calculating of the mean of clock sink locations of the set of clock sinks comprises:
calculating a mean of longitudinal coordinates of the set of clock sinks; and
calculating a mean of latitudinal coordinates of the set of clock sinks.

14. The method of claim 12, wherein the calculating of the center of the set of clock sinks further comprises weighting a location of a clock sink based on a capacitance value associated with the clock sink prior to calculating the mean of all clock sink locations.

15. The method of claim 9, further comprising generating a layout instance for the IC device design based in part on the clock tree, the layout instance describing physical layout dimensions of the IC device design.

16. A computer-storage medium storing instructions, which when executed by a machine, cause the machine to perform operations comprising:
constructing a spanning tree comprising one or more paths that interconnect a set of clock sinks of a clock net in an integrated circuit (IC) device design, the spanning tree comprising a first path that connects a first and second clock sink;
identifying a second path that connects the first and second clock sinks, the second path being distinct from the first path;
augmenting the spanning tree to include the second path in addition to the first path;
calculating a center of the set of clock sinks in the clock net based on a mean of clock sink location coordinates of the set of clock sinks in the IC device design;
identifying a point on the spanning tree nearest to the center of the set of clock sinks;
assigning a clock driver to a position corresponding to the point on the spanning tree nearest to the center of the set of clock sinks, the assigning of the clock driver to the position resulting in a clock tree; and
generating a layout instance for the IC device design based in part on the clock tree, the layout instance describing physical layout dimensions of the IC device design.

17. The computer-storage medium of claim 16, wherein the calculating of the center of the set of clock sinks comprises calculating a mean of the clock sink locations of the set of clock sinks.

18. The computer-storage medium of claim 17, wherein:
each dock sink location comprises a longitudinal coordinate and a latitudinal coordinate;
the calculating of the mean of clock sink locations of the set of clock sinks comprises:
calculating a mean of longitudinal coordinates of the set of clock sinks; and
calculating a mean of latitudinal coordinates of the set of clock sinks.

19. The computer-storage medium of claim 17, wherein the calculating of the center of the set of clock sinks further comprises weighting a location of a clock sink based on a capacitance value associated with the clock sink prior to calculating the mean of all clock sink locations.

20. The computer-storage medium of claim 16, wherein the constructing of the spanning tree comprises constructing a minimum-spanning-tree, the minimum-spanning-tree minimizing a total length of the one or more paths that interconnect the set of clock sinks.

* * * * *